United States Patent
Zimmermann et al.

(10) Patent No.: US 6,314,922 B1
(45) Date of Patent: Nov. 13, 2001

(54) HAND-HELD WORKING TOOL

(75) Inventors: Helmut Zimmermann; Werner Geyer, both of Berglen; Jörg Schlossarczyk, Winnenden; Hans Nickel, Cottenweiler; Harald Schliemann, Waiblingen; Gunter Stein, Winnenden, all of (DE); Peter Stücke, Virginia Beach, VA (US); Bernhard Dürr, Stuttgart; Axel Klimmek, Schwaikheim, both of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/360,107

(22) Filed: Jul. 23, 1999

Related U.S. Application Data

(63) Continuation-in-part of application No. 09/199,930, filed on Nov. 25, 1998, now abandoned.

(30) Foreign Application Priority Data

Jul. 23, 1998 (DE) .............................. 198 33 126

(51) Int. Cl.[7] ....................................... F01P 7/04
(52) U.S. Cl. .................. 123/41.65; 423/41.7; 423/41.56
(58) Field of Search ............................. 123/41.56, 41.63, 123/41.65, 41.66, 41.7

(56) References Cited

U.S. PATENT DOCUMENTS

| | | | |
|---|---|---|---|
| 4,543,915 | * 10/1985 | Nagashima et al. | 123/41.65 |
| 4,890,583 | * 1/1990 | Ohno et al. | 123/41.65 |
| 5,343,831 | * 9/1994 | Collins | 123/198 E |
| 5,542,380 | * 8/1996 | Chatten | 123/41.7 |
| 5,746,160 | * 5/1998 | Stark et al. | 123/198 E |
| 6,062,177 | * 5/2000 | Becker et al. | 123/41.63 |

* cited by examiner

Primary Examiner—Willis R. Wolfe
Assistant Examiner—Jason Benton
(74) Attorney, Agent, or Firm—Robert W. Becker & Associates; Robert W. Becker

(57) ABSTRACT

A hand-held working tool has a housing and an internal combustion engine arranged in the housing and comprising a crankshaft and an air filter. A tool is driven by the crankshaft of the internal combustion engine. A fan housing is attached to the engine housing and has an air inlet. A fan wheel is arranged in the fan housing and is driven by the crankshaft of the internal combustion engine to supply cooling air, sucked in through the air inlet, to the internal combustion engine. The fan housing has a bottom extending radially to the crankshaft. The bottom and a side of the fan wheel facing the bottom define a chamber in the fan housing. The bottom has a combustion air outlet. A combustion air channel is connected to the combustion air outlet and to the air filter. The combustion air outlet is axially supplying combustion air from the chamber through the combustion air channel into the air filter of internal combustion engine. The fan housing has a channel wall having a bottom portion connected to the face of the bottom remote from the fan wheel and covering the bottom partially to form a double-walled bottom. The end face portion of the combustion air channel is defined by the bottom and the bottom portion of the channel wall. In an alternative embodiment the combustion air channel is provided in a hollow beam of a support that supports the drive unit of the working tool.

44 Claims, 8 Drawing Sheets

HAND-HELD WORKING TOOL

This application is a Continuation-In-Part of application Ser. No. 09/199,930, filed Nov. 25, 1998 now abandoned.

BACKGROUND OF THE INVENTION

The present invention relates to a hand-held working tool, especially a motor chainsaw etc., comprising an internal combustion engine arranged in a housing and having a crankshaft for driving a tool and a fan wheel. The fan wheel is arranged in a fan housing and conveys through an air inlet cooling air to the internal combustion engine. Combustion air is axially guided through an outlet opening in the housing bottom via a combustion air channel to the air filter of the internal combustion engine.

U.S. Pat. No. 3,994,076 discloses a motor chainsaw in which an air-cooled internal combustion engine is arranged in a housing. The crankshaft of the internal combustion engine supports at one end the drive member for the tool, i.e., a saw chain circulating on a guide bar. The other end drives a fan wheel which is arranged within a fan housing and takes in cooling air through an air inlet for supplying the cooling air to the combustion engine. A portion of the intake air of the fan wheel is guided as combustion air to the air filter of the internal combustion engine. The combustion air is supplied via an outlet opening, provided in the bottom of the fan housing and covered by the fan wheel, in the axial direction and is guided via a combustion air channel to the air filter. The known arrangement with axially directed air removed from a chamber that is delimited by the fan housing bottom and the end face of the fan wheel and that contains centrifuged suction air will provide substantially dust-free combustion air to the dirt chamber of the air filter.

The outlet opening in the known device is arranged centrally within the bottom of the fan housing, i.e., adjacent to the crankshaft bearing within the crankshaft housing of the internal combustion engine. The combustion air channel connected to the outlet opening must have over its entire length a sufficiently large flow cross-section for supplying the required combustion air amount. In the known arrangement the combustion air channel connection between the outlet opening at the housing bottom and the air filter as well as, in the flow direction, the connection downstream to the carburetor of the internal combustion engine requires great constructive expenditures. The complicated channel design of the combustion air channel increases the size of the working tool so that its ease of manipulation and operating comfort are impeded.

It is therefore an object of the present invention to provide a working tool of the aforementioned kind with which a simple guiding of clean combustion air in combination with a compact design of the hand-held working tool is possible.

SUMMARY OF THE INVENTION

Expediently, the combustion air channel is delimited by the bottom of the fan housing and by a channel wall portion that covers partially the bottom of the fan housing so as to form a double-walled bottom.

In another embodiment, the combustion air channel is provided within a hollow support of the working tool that is supports the drive unit including the internal combustion engine.

When providing a combustion air channel which is embodied by a channel wall covering the bottom of the fan housing as a double-walled bottom of the fan housing, the air can be guided on the shortest possible path, i.e., perpendicularly to the direction of extension of the crankshaft, to the air filter. The combustion air channel may extend about a large radial portion of the fan housing bottom so that a sufficiently large flow cross-section is achieved already with a minimal depth of the double-walled bottom while the entire arrangement is space-saving. An especially compact construction for the shortest extension of the combustion air channel is provided when the combustion air channel at the level of the combustion air outlet in the fan housing bottom is completely positioned at the end face of the fan housing and includes a tangential portion of the channel wall extending in the flow direction past the periphery of the bottom and at least partially in the circumferential direction of the fan housing. The channel wall is connected to the circumferential wall of the fan housing, covering the fan wheel, spaced from the plane of the fan housing bottom. This arrangement defines a circumferential portion of the combustion air channel at the outer side of the circumferential wall. The respective flow cross-section of the end face portion of the combustion air channel covering the fan housing bottom is reduced in the flow direction, and the required flow cross-section is provided by an increasing widening of the circumferential portion of the combustion air channel.

Advantageously, the combustion air channel, respectively, its end section at the air filter or the air filter dirt chamber can be positioned entirely on the side of the plane of the fan housing bottom opposite the end face portion so that, due to the minimal axial extension of the arrangement, the fan housing can be positioned in the vicinity of the crankshaft housing of the internal combustion engine. This arrangement provides a compact design of the working tool.

A minimal size of the drive unit of the hand-held working tool can also be provided by supplying the combustion air through a hollow support beam of the working tool. The support beam has connected thereto the drive unit as well as guide and support elements and optionally further components of the working tool. The combustion air channel extends through the hollow support beam whereby an inlet opening in the wall of the support beam coincides with the combustion air outlet at the bottom of the fan housing. The air-conducting connection for introducing the combustion air, axially removed from the fan housing, into the support beam is preferably provided by a connecting channel member which is made of elastic material and is formed-lockingly connected to the respective openings and in addition provides vibration dampening.

Expediently, the combustion air channel branches substantially tangentially to the rotational direction of the fan wheel away from the fan housing and extends substantially straight to the air filter so that the flow path of the combustion air is kept short and the flow resistance of the combustion air channel is reduced. The inlet area of the combustion air channel is delimited by the housing bottom and a channel wall that forms a double-walled bottom with the housing bottom of the fan housing so that the assembly of fan housing and combustion air channel is of a small size in the axial direction relative to the crankshaft axis. The fan housing can be mounted adjacent to the internal combustion engine or its crankcase so that the drive unit of the working tool is of a compact design.

When the flow cross-section of the combustion air channel widens in the flow direction, a sufficient amount of air reaches the air filter box of the internal combustion engine without any flow resistance at any operational state of the engine. Pulsation events in the combustion air stream due to cyclical operation of the combustion engine are prevented by the small length but relatively wide flow cross-section of the combustion air channel. The air filter box and the fuel metering or mixture forming devices of the combustion engine can be arranged directly adjacent to the combustion engine because, due to the inventive design, these components are not subject to vibrations. The combustion air channel is of an especially flat design in the inlet area whereby the combustion air channel wall forming the double-walled bottom of the fan housing can be positioned in close proximity to the combustion engine. The assembly comprised of fan housing and combustion air channel can be realized in an especially flat design when the widening of the flow cross-section is realized by a widening of the inlet area parallel to the housing bottom. Expediently, the combustion air channel has a rectangular cross-section so that the side facing the combustion engine has a large surface area. The fan housing can thus be slipped onto the drive pin of the crankshaft for the fan wheel and thus be positioned very closely to the combustion engine.

Advantageously, the outlet opening into the combustion air channel that is provided in the housing bottom is arc-shaped and elongate in the rotational direction of the fan wheel so that air can flow without hindrance from the space defined between the fan wheel and the housing bottom into the combustion air channel. The end of the outlet opening to the rear in the rotational direction extends as wide as possible and provides a widened cross-section in the inlet area of the combustion air channel which has a flat design at the back side of the fan housing. The rearward end of the outlet opening is positioned expediently adjacent to a plane of the mantle surface of the combustion air channel that is facing the crankshaft. The forward end of the outlet opening in the rotational direction of the fan wheel is arranged at a side of the crankshaft opposite the combustion engine and allows an early inflow into the combustion air channel.

In the inlet area of the combustion air channel, which is embodied at the backside of the fan housing by a double-walled bottom, a cross-sectional widening of the flat combustion air channel is preferably realized across the entire radius of the housing bottom by widening the channel parallel to the housing bottom. External to the channel portion that covers the housing bottom, the combustion air channel is also axially widened whereby the channel wall is connected to a circumferential wall of the fan housing covering axially the fan wheel at a location opposite a plane of the housing bottom.

BRIEF DESCRIPTION OF THE DRAWINGS

The object and advantages of the present invention will appear more clearly from the following specification in conjunction with accompanying drawings, in which.

DESCRIPTION OF PREFERRED EMBODIMENTS

The present invention will now be described in detail with the aid of several specific embodiments utilizing FIGS. 1 through 6.

Figure 1:
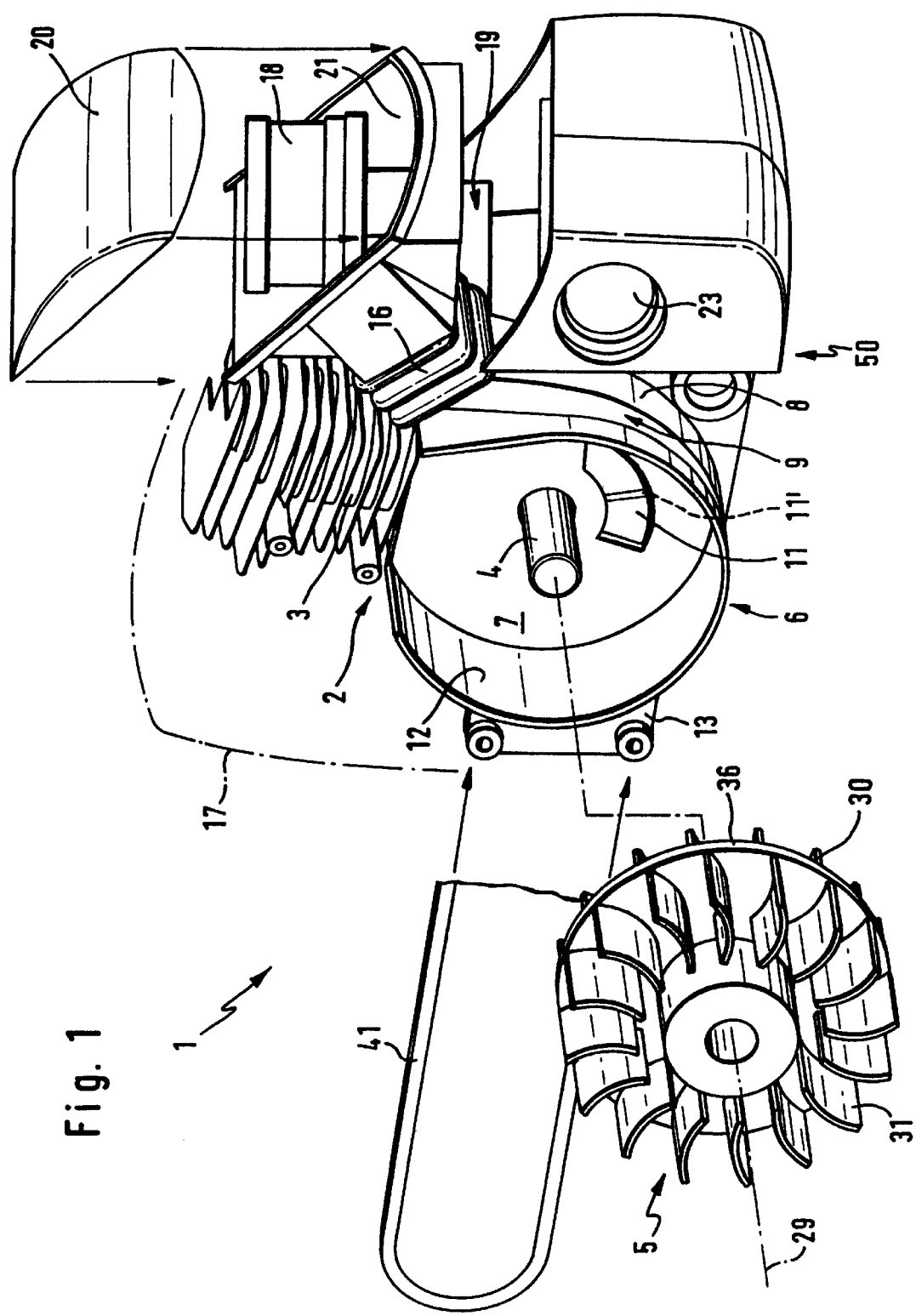
FIG. 1 shows a motor chainsaw in a schematic representation.

The hand-held working tool schematically represented in FIG. 1 is a motor chainsaw 1 which is substantially comprised of a drive unit 50 and a tool, i.e., a driven saw chain 41 which circulates on a guide bar. The drive unit 50 is comprised substantially of an internal combustion engine 2 arranged within the housing 17. In the shown embodiment the engine 2 is an air-cooled two-stroke internal combustion engine to be supplied with combustion air and cooling air by a fan which will be disclosed in the following. The drive unit 50 comprises furthermore a fuel tank 23 as well as an air filter 18 through which the combustion air will flow before entering the cylinder 3 of the internal combustion engine 2. The drive unit 50 is fastened to a support 13 of the motor chainsaw 1 which is provided with non-represented gripping and holding elements.

The drive pinion for the saw chain 41 is driven by the crankshaft 4 of the internal combustion engine on the side of the internal combustion engine 2 behind the paper plane. A drive shaft of the chain pinion is connectable by a non-represented centrifugal clutch to the output end of the crank shaft 4. The end of the crank shaft 4 on the opposite side of the internal combustion engine and shown in the drawing drives a fan wheel 5 which is arranged within the fan housing 6 and which sucks in cooling air through an air inlet within the housing 17. The fan housing 6 is comprised substantially of a bottom 7 which extends radially to the axis of the crankshaft between the fan wheel 5 and the internal combustion engine 2. The fan housing 6 also includes a circumferential wall 12 that substantially axially covers the fan wheel 5. The circumferential wall 12 guides the air supplied by the fan wheel 5 and has a cut-away arc portion in order to provide a cooling air outlet. With a suitable course of the circumferential wall 12 the fan housing 6 is embodied as a guide spiral open toward the combustion engine 2 whereby cooling air is blown through the outlet onto the cooling ribs provided at the cylinder 3.

The fan housing bottom 7 is provided with a combustion air outlet 11 that is covered by the fan wheel 5. The combustion air outlet allows air to be removed from the chamber of the fan housing defined by the fan housing bottom 7 and the end face of the fan wheel 5. The combustion air outlet 11 can be divided by one or more reinforcement stays provided at the bottom 7 into windows. Advantageously, such a stay can extend, as shown in dashed lines in the drawing and referenced by reference numeral 11', in the radial direction toward the crankshaft 4. In the chamber closed off by the fan wheel 5 intake air which is already pre-filtered by the cyclone effect is present which can then be guided axially through the combustion air outlet 11 to the air filter device. The air filter device 18 comprises an air filter arranged within an air filter box 19 which is covered by a filter cover 20 for closing off the dirt chamber 21. The clean air side of the air filter 18 is connected to the fuel metering device of the internal combustion engine 2 which in the shown embodiment is a carburetor.

A combustion air channel 9 connects the combustion air outlet 11 within the bottom 7 of the fan housing 6 to the air inlet of the dirt chamber 21 of the air filter box 19. The air filter box 19 is positioned substantially at the level of the cylinder 3 of the combustion engine in order to provide short flow paths to the carburetor which is conventionally arranged adjacent to the intake valve of the cylinder 3. The combustion air outlet 11 within the bottom 7 of the fan housing 6 is positioned opposite the cylinder 3, relative to the crankshaft 4, so that detrimental heating of the combustion air by the presence of the combustion engine 2 is prevented. In order to provide for a compact mounting of the drive unit 50 for short flow paths of the combustion air in the combustion air channel, and to thus improve manipulation of the motor chainsaw 1, the fan housing bottom 7 is embodied over portions thereof as a double-walled bottom. The combustion air channel 9 in this area is thus provided at the end face of the fan housing 6 and is delimited by the fan housing bottom 7 and a bottom portion 8s of the channel wall 8 covering the bottom 7 of the fan housing 6. The channel wall 8 is tangentially guided past the periphery of the bottom 7 and is connected at a spacing to the outer side of the circumferential wall 12 of the fan housing 6 on the opposite side of the plane of the housing bottom 7. The channel wall 8 is designed such that the combustion air channel 9 in the flow direction first has an end face portion 9s which, in addition to the bottom portion 8s of the channel wall 8, is also delimited by the housing bottom 7 and then has a transition into a circumferential portion 9u which is delimited by the tangential portion of the channel wall 8 at the circumferential wall 12. The respective flow cross-section of the end face portion 9s in the flow direction of the combustion air channel 9 is constantly reduced and the flow cross-section of the circumferential portion 9u is respectively widened.

The fan housing 7 with a compact combustion air channel 9 provided thereat thus has a minimal axial depth and allows a reduction of the constructive size of the drive unit 50 because the bottom 7 of the fan housing 6 is positioned directly adjacent to the internal combustion engine 2 and at its crankshaft housing. The combustion air outlet 11 is radially positioned relative to the crankshaft axis 29 such that the bottom portion 8s of the channel wall 8 projecting from the plane of the housing bottom 7 is positioned below the crankshaft housing. The best separation results in regard to the particle load of the intake air has been achieved when the radial spacing of the outer edge of the combustion air opening 11 is approximately 0.5 to 1.4 times the radius of the fan wheel 5 whereby the value 0.84 is a preferred spacing of the combustion air outlet 11. Especially favorable separation effects have been achieved when the outlet 11 projects radially past the fan wheel 5 whereby the radial spacing of the outer edge preferably is by about 5% greater than the radius of the fan wheel. It is expedient when the radius of the inner edge of the suction opening 11 is as small as possible in order to provide a flow cross-section as large as possible.

The combustion air channel 9 extends in the fan housing 6 in the direction of rotation of the fan wheel 5. Its end portion is embodied completely as a circumferential channel and has an end socket with circumferential edge. An elastic bellows 16 is placed onto the end socket which provides the connection to the inlet socket of the air filter box 19. It bridges a vibration gap adjacent to the internal combustion engine 2 and with its elastic material properties can dampen the vibrations of the drive unit 50. Advantageously, the bellows 16 is an anti-vibration element for the combustion engine. The fan housing 6 with combustion air channel 9 embodied thereat will be explained in more detail with the aid of FIGS. 3 and 4.

In a further embodiment of the fan housing the combustion air outlet can be embodied at the side of the fan housing bottom facing the air filter in order to shorten the combustion air channel.

This ensures an excellent dirt particle separation without output loss of the engine. Advantageously, the ratio of channel length to diameter is smaller than 2 which, for example, can be realized for a position of the combustion air outlet in the fan housing bottom above a flange plane of the cylinder flange. The combustion air channel can be embodied in a compact design within the tank housing.

The fan wheel 5 supports at the two axial end faces vane arrangements 30, 31 which are separated from one another by a radial wall 36 forming the base body of the fan wheel 5. The suction side facing away from the combustion engine 2 is provided with a vane arrangement 31 that sucks in the cooling air. The vane arrangement 30 at the opposite side within the chamber facing the fan housing bottom 7 is not efficient as a blower. Instead, it is used to centrifuge the dirt particles out of the intake air that is sucked in through the chamber and the combustion air channel 9 by the combustion engine 2. The design and function of the fan wheel 5 will be explained in the following with the aid of FIG. 5.

Figure 2:
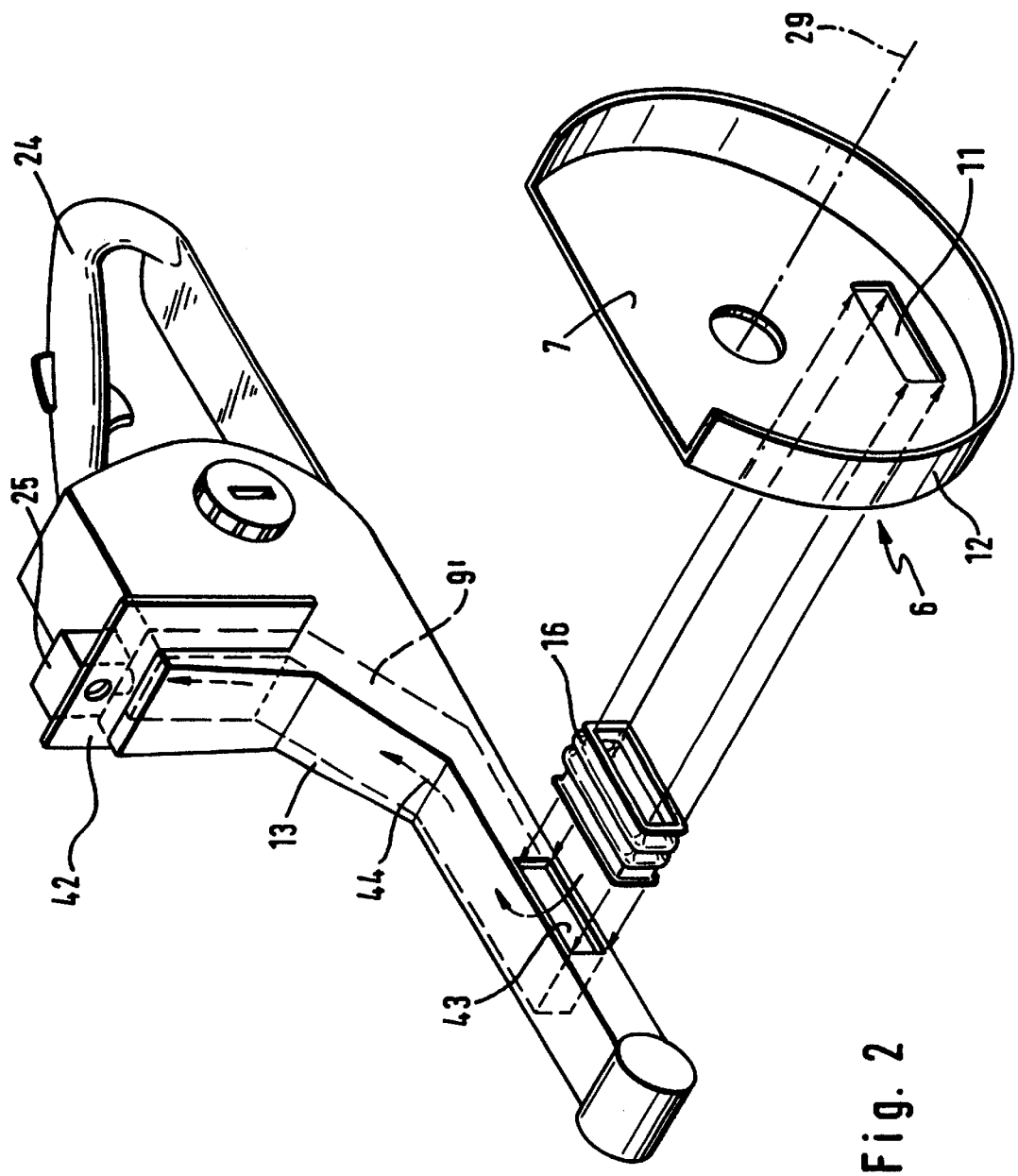
FIG. 2 shows a schematic representation of a combustion air channel positioned within the support beam of the motor chainsaw.

FIG. 2 shows a further possibility for designing the motor chainsaw which allows for axial removal of clean combustion air from the fan housing 6 while providing a compact design of the working tool. As has been mentioned above, the motor chainsaw conventionally has a support 13 to which components of the drive unit (internal combustion engine, tank, air filter, etc.) and the housing are attached. The support 13 is comprised essentially of a stretched forward portion which engages below the internal combustion engine and a rearward upwardly oriented portion to which is connected the carburetor 25 at the level of the cylinder of the internal combustion engine. A grip 24 is also connected to the support 13 and includes an actuating lever for the chainsaw. The grip 24 is positioned behind an upwardly extending portion of the support 13 in a substantially planar wall 42 to which the carburetor 25 is fastened. The support 13 is inventively comprised of a hollow support beam whereby the combustion air channel 9' extends within the hollow support beam and thus eliminates the need and the space for a separate component serving as a combustion air channel. The stretched forward portion of the support 13 has an opening 43 which coincides with the outlet 11 at the fan housing bottom 7. An air-tight connection between the outlet 11 of the fan housing 6 and the opening 43 of the support 13 is provided by an elastic bellows 16' which with its compressed end portion can be attached to (snapped into) the respective openings 11, 43 in a positive-locking manner. The elastic connection between the fan housing 6 and the support 13 avoids additionally the detrimental transmission of vibrations during operation of the motor chainsaw.

Figure 3:
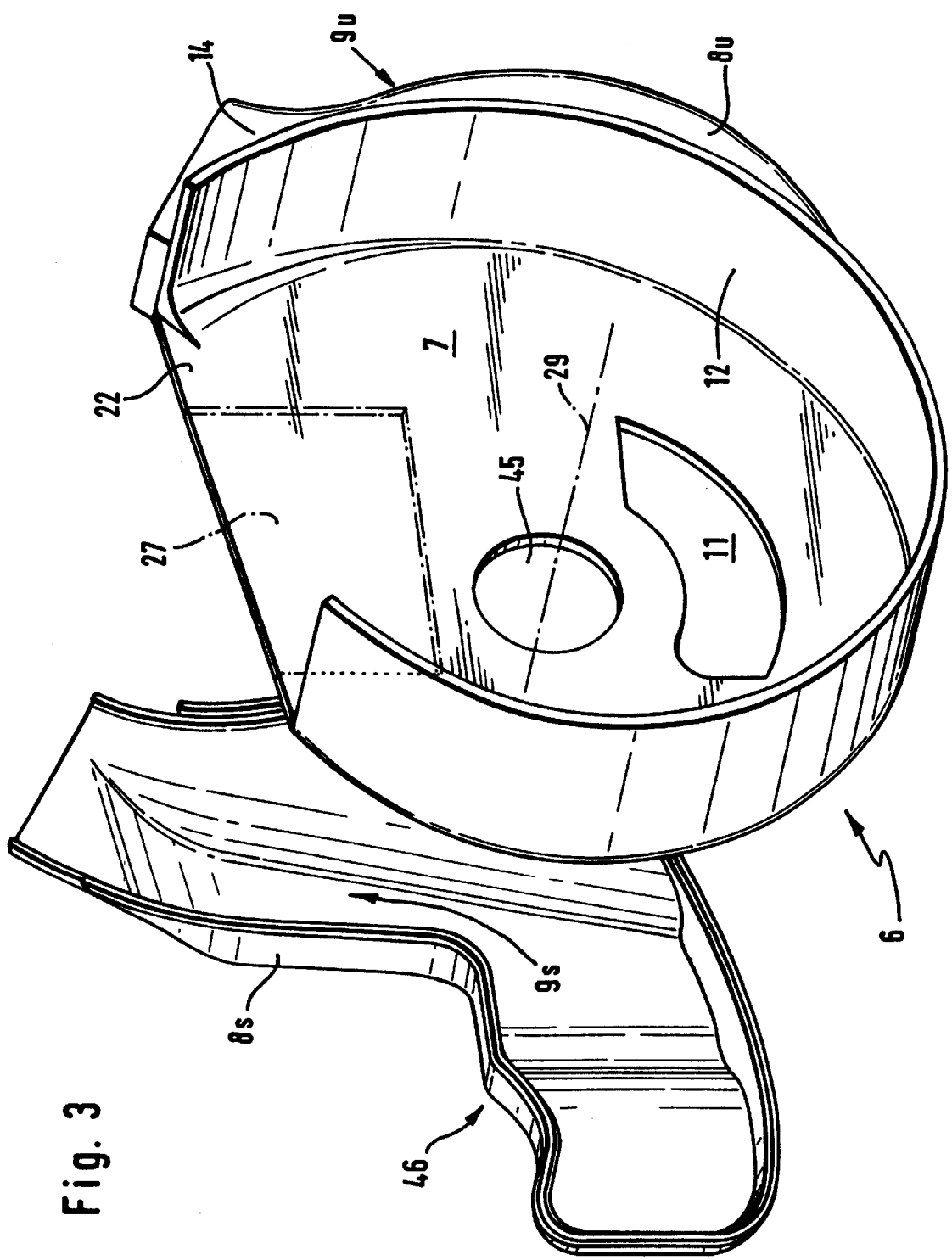
FIG. 3 shows a perspective view of the fan housing.

FIG. 3 shows the fan housing 6 of the motor chainsaw represented in FIG. 1 in a perspective view from the end face of the housing 7 that is open for allowing introduction of cooling air. This open end face in the mounted state of the motor chainsaw is covered by a grill allowing air flow into the fan housing 6. The fan housing 6 is comprised of a fan housing bottom 7 extending perpendicularly to the crankshaft axis 29 and a circumferential wall 12 extending perpendicularly to the housing bottom 7. The wall 12 axially covers the height of the fan wheel 5 rotating within the fan housing 6. The bottom 7 is provided with a central opening 45 through which the crankshaft of the internal combustion engine 2 projects into the fan housing 6 for driving the fan wheel 5. The radius of the circumferential wall 12 relative to the crank shaft axis 29 increases in the rotational direction of the fan wheel 5 so that between the fan wheel 5 and the circumferential wall 12 an air guide spiral is formed. The circumferential wall 12 is open at an arc section which faces the internal combustion engine when mounted so that at the end of the air guide spiral a directed cooling air outlet 22 is formed. As already disclosed in connection with FIG. 1, the fan housing bottom 7 is provided with a combustion air outlet opening 11 which is positioned diametrically opposed to the cooling air outlet 22 and through which combustion air can be axially removed from the chamber defined between the fan housing bottom 7 and the fan wheel. The cross-section of the combustion air outlet 11 must be matched to the required combustion air flow and extends in the embodiment over an angular distance of 70°.

The combustion air channel 9 connected to the combustion air outlet 11 is comprised of a end face portion 9s, covering partially the bottom 7 and forming a double-wall housing bottom, and further comprised of a circumferential portion 9u following the end face portion 9s in the flow direction. In the inflow area of the combustion air channel the bottom portion 8s of the channel wall 8 projects from the plane of the bottom 7 and defines a flow cross-section in the end face portion 9s which is defined by the axial projection as well as the radial extension of the combustion air channel. In the area of the end face portion 9s the combustion air channel is thus defined between the double-walled housing bottom, i.e., is delimited by the bottom portion 8s of the channel wall 8 and the fan housing bottom 7. The channel wall 8, in the flow direction of the combustion air channel, is then guided tangentially past the periphery of the fan housing bottom 7 and is connected with increasing spacing to the circumferential wall 12 on the opposite side of the plane of the bottom 7. The tangential portion 8u of the channel wall 8u delimits the circumferential portion 9u of the combustion air channel 9 at the outer side of the circumferential wall 12.

The fan housing 6 in the shown embodiment is of a two-part construction. It is comprised of a base member which includes the fan housing bottom 7 and the circumferential wall 12 and is further comprised of an end face member 46 comprising the bottom portion 8s of the channel wall 8 corresponding to the end face portion 9s projecting from the plane of the bottom. The member 46 is connected to the end face of the fan housing bottom 7 of the base member facing the combustion engine. The bottom portion 8s extends arc-shaped and, in the mounted state of the fan housing 6, surrounds the crankshaft housing of the internal combustion engine so that the fan housing 6 is arranged directly adjacent to the internal combustion engine.

Figure 4:
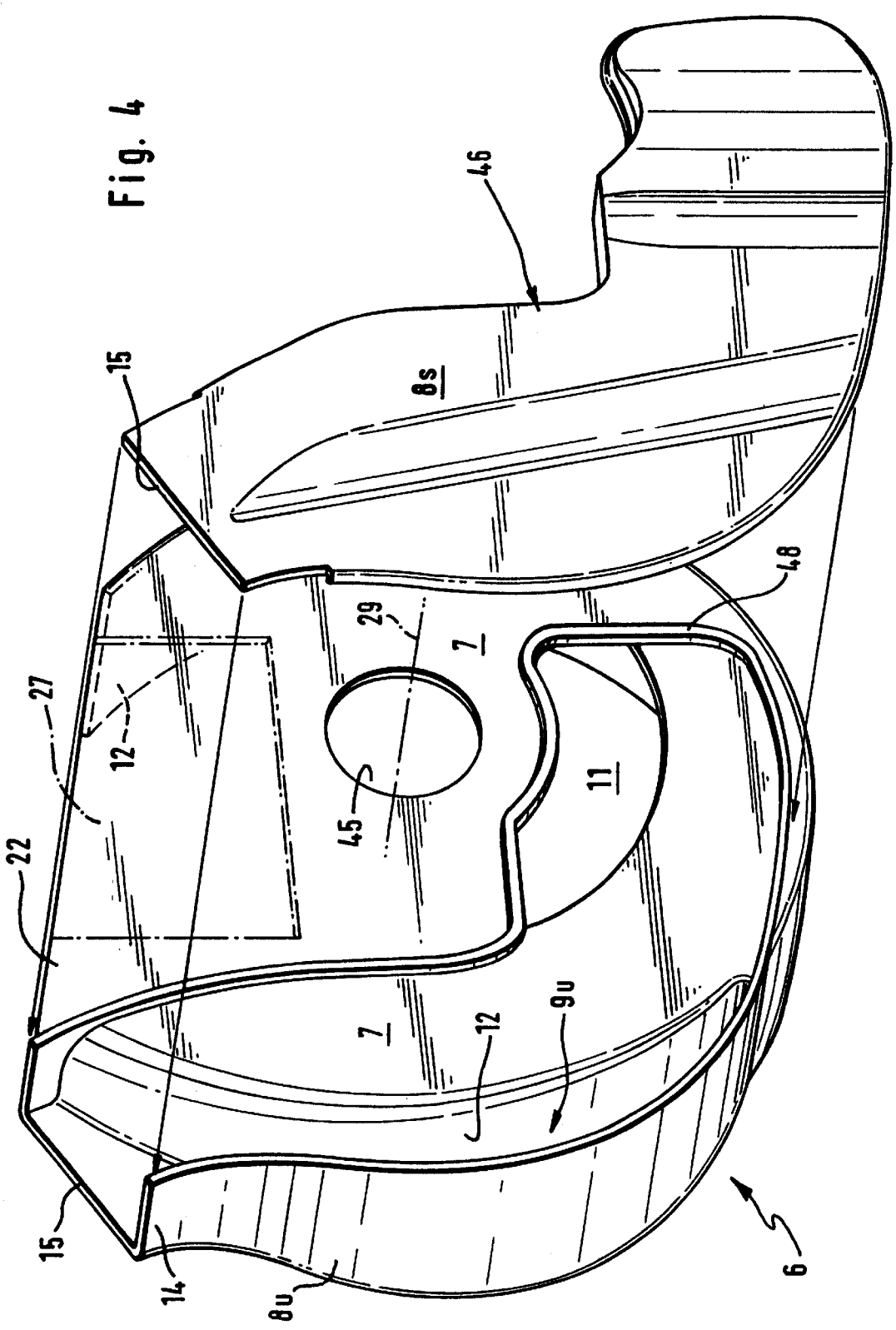
FIG. 4 shows the opposite side of the fan housing of to FIG. 3 in a perspective view.

As can be seen in FIG. 4, the backside of the fan housing bottom 7 has a projecting edge 48 which serves to fasten the end face member 46 to the base member. The channel wall 8s (bottom portion) of the end face member 46 and the channel wall 8u (tangential portion) providing the circumferential portion 9u have such a shape that the flow cross-section of the combustion air channel, despite reduction of the cross-sectional portion at the end face and widening of the cross-section in the circumferential direction, always provides a substantially uniform total flow cross-section so that the required amount of combustion air is thus provided without flow losses. At the end portion of the combustion air channel the channel wall 8u (tangential portion) provides an end socket 14 which extends radially across the circumferential wall 12 of the fan housing 6. The end portions of the channel walls (8u, 8s) of the fan housing 6 respectively, the end face member 46 provide a circumferential edge 15 so that the end socket 14 can receive an elastic bellows 16. The combustion air channel is integrated into the fan housing and is thus air-tight so that the intake of dirt particles through leakage within the channel is prevented.

In the bottom 7 a cutout 27 may be provided below the open arc portion of the circumferential wall 12 which improves the flow of cooling air to the cooling ribs of the cylinder. Furthermore, such a cutout 27 can also supply heated air into the chamber adjacent to the bottom 7. It is thus possible to supply already pre-heated combustion air through the outlet 11 within the bottom 7 to the combustion engine, which is especially favorable when operating the motor chainsaw in winter. When for an extended operating period of the motor chainsaw high temperature fluctuations are to be expected so that on the one hand winter operation with pre-heated air is desirable, but during summer operation the increase of the combustion air temperature would result in heating past an allowable limit, it is simply possible to provide instead of the cutout 27 a second outlet 11 in the bottom 7 for axial removal of combustion air from the housing. It is then possible to connect to the second outlet 11 a second combustion air channel which can be used as an alternative to the first combustion air channel during winter operation of the motor chainsaw when providing a corresponding air guiding device.

Figure 5:
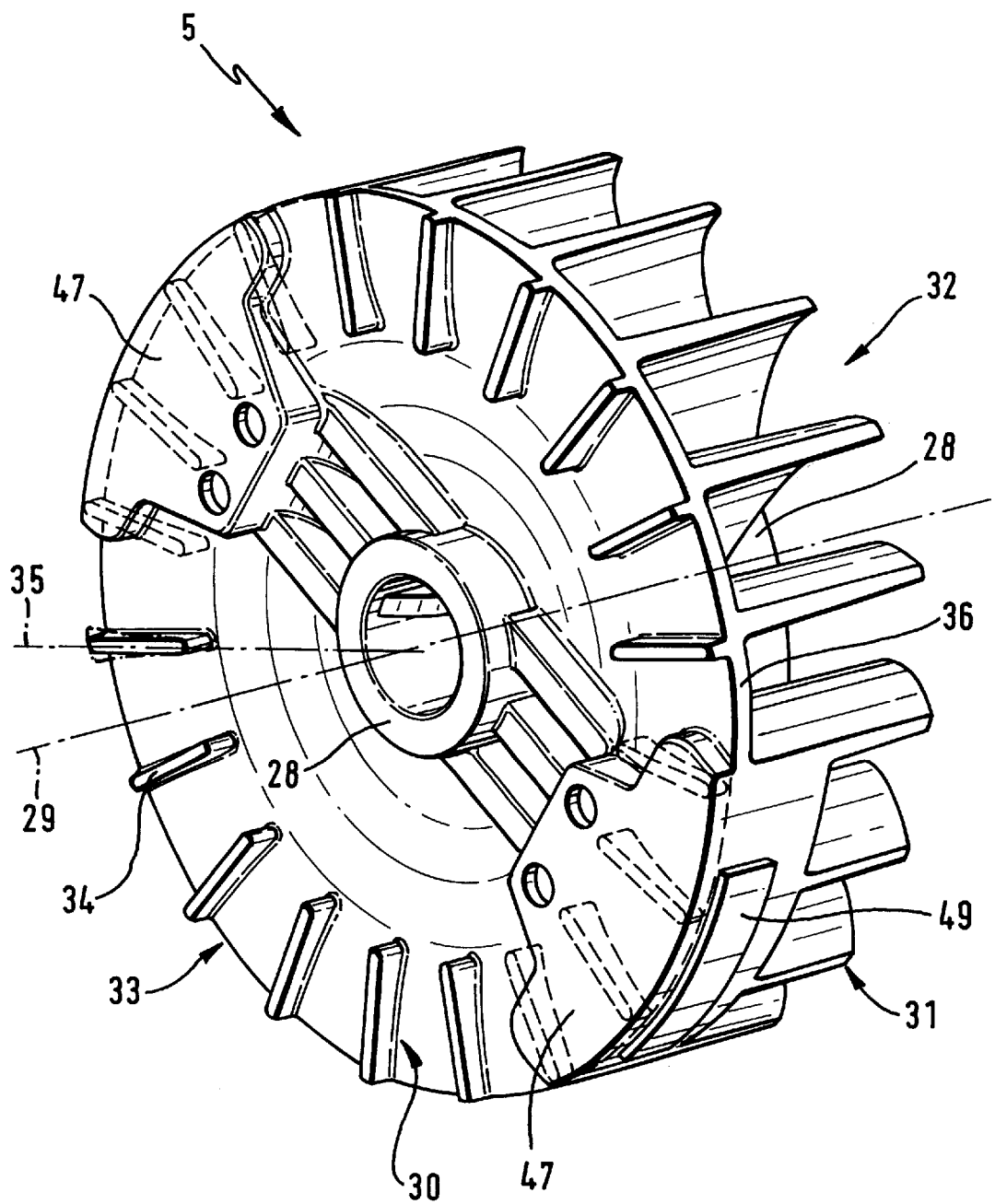
FIG. 5 shows a fan wheel in a perspective representation.

FIG. 5 shows in a perspective representation a preferred embodiment of a fan wheel. The fan wheel 5 supports on both end faces a vane arrangement 30, 31. They are separated from one another by a radial wall 36 defining the base body of the fan wheel 5. The fan wheel 5 is supported by a hub 28 on the crank shaft of the internal combustion engine and is rotationally fixedly connected thereto such that the removal side 33 of the fan wheel, which is provided with the vane arrangement 30 with radially extending vane cross-sections, is positioned adjacent to the bottom 7 of the fan housing 6. The radial wall 36 delimits thus a chamber from which the combustion air can be removed as disclosed above. The oppositely arranged suction side 32 of the fan wheel 5 is provided with a vane arrangement 31 having vanes for taking in cooling air and accelerating the cooling air within the fan housing by a cyclone effect.

The radial arrangement of the cross-sections 34 or the vanes of the vane arrangement 30 reduces upon rotation their blower effect which is centrifugal and thus counter to the flow of the suction air and which would reduce output of the internal combustion engine because of negative effects on the gas change work. The vacuum within the chamber 10, due to the weak blower effect of the vane arrangement 30, is so minimal that the power output of the internal combustion engine which takes in combustion air from the chamber 10 is hardly affected. The cross-section 34 of the vane arrangement 30 increases with increasing radius in the circumferential direction of the fan wheel 5 (schematically shown only at one vane 34' in dashed lines). With this conical embodiment of the vanes a favorable radial velocity gradient of the intake air flow is produced below the fan wheel 5. The cross-section 34 of the vanes is symmetrical with respect to the radial axis 35 of the fan wheel 5.

The vane arrangement 30 is axially of a smaller size than the vane arrangement 31 at the suction side 32 of the fan wheel so that a great amount of cooling air can be supplied and guided onto the cooling ribs of the combustion engine. The axial width of the vane arrangement 30 determines substantially the flow cross-section of the chamber for flow of the combustion air taken from the cooling air flow. The vane arrangement 30 is embodied with greatest possible height of the vanes in order to produce a great flow cross-section within the chamber 10. In a preferred design of the vane arrangement a chamber that is as wide as possible with greatest axial spacing of the radial wall 36 to the bottom 7 of the fan housing 6 whereby the height of the vanes is at least half of this spacing.

The height of the vane arrangement 30 can advantageously be 5 mm. In order to provide for an optimized separation effect, the axial spacing between the vanes and the bottom 7 should be as minimal as possible. The spacing provides a compensation of the construction tolerances and is, for example, 1 to 2 mm.

The radial wall 36 is curved inwardly toward the suction side 32 of the fan wheel 5 so that the axial extension of the chamber 10 toward the hub 28 of the fan wheel 5 increases. The increased volume of the chamberat its inner area dampens pressure pulsation of the combustion air resulting from the cyclical suction stroke in the respective working cycles of the internal combustion engine. The vane arrangement 30 provides with minimal blower effect onto the air flow the desired centrifugal force for the particles contained within the air flow so that these particles are separated and a prefiltering action of the combustion air before entering the air filter is provided.

The fan wheel 5 is a pole wheel of a solenoid ignition device and supports at its periphery an ignition solenoid which is arranged within the vane arrangement 30 of the removal side 33 and projects axially from the radial wall 36 into the vane arrangement 31. The ignition solenoid 49 is embedded into the circumferential surface of a flywheel mass 47 of the fan wheel 5. The fan wheel 5 comprises two diametrically opposed flywheel masses 47 which may be both provided with an ignition solenoid.

The arrangement of the ignition solenoids and of the flywheel masses 47 in the vane arrangement 30 provides for pulsation which impedes back flow into the chamber counter to the suction direction without having an effect on the cyclone effect of the vane arrangement 30.

It may also be advantageous, as shown in dashed lines for the vane arrangement 30, to project from the end faces of the flywheel masses 47 of the fan wheel 5 so that on the entire circumference of the vane arrangement centrifugally acting vanes are provided on the suction side 33 of the fan wheel 5. The end faces of the flywheel mass pieces 47 are positioned radially inwardly spaced from a plane of the free ends of the vanes 30 so that in the mounted state of the fan wheel 5 a circumferential annular gap in the chamber is provided. In this manner, the noise development for the flow air can be reduced at the removal side 33 of the fan wheel 5.

In order to reduce the flow resistance of the air flow in the chamber and in the combustion air channel, which flow resistance must be overcome by the intake suction of the internal combustion engine, an auxiliary axial blower vane arrangement in the same radial position as the combustion air outlet in the bottom 7 can be provided at the removal side 33 of the fan wheel 5 in addition to the inefficient vane arrangement already provided thereat. The auxiliary axial blower vane arrangement passes across the combustion air outlet when the fan wheel is rotating and thus pushes combustion air through the combustion air outlet into the combustion air channel and thus reinforces the suction force of the internal combustion engine.

Figure 6:
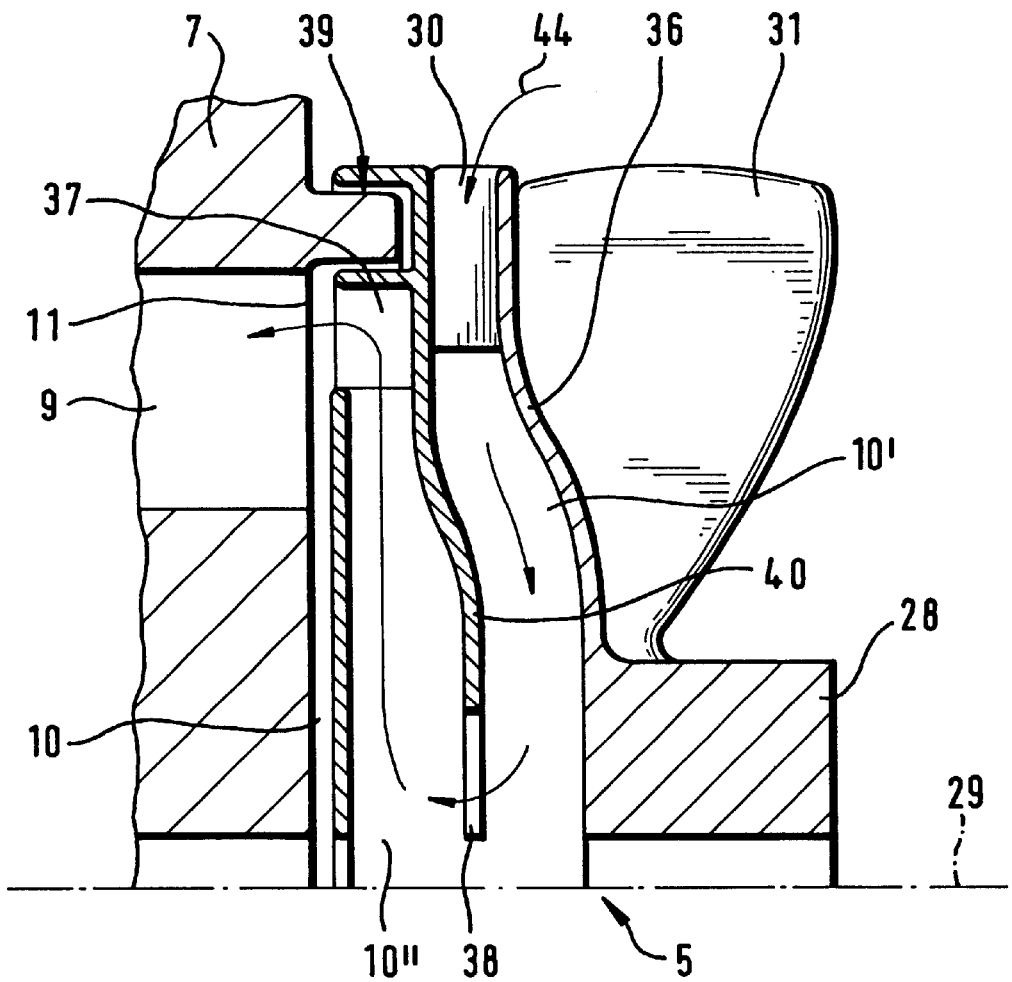
FIG. 6 is a perspective representation of a closed embodiment of the fan wheel.

FIG. 6 shows in a schematic representation a section of a fan wheel 5 in a closed embodiment in which the removal side of the fan wheel 5 is radially covered by a cover plate 40 rotating with the fan wheel 5. The cover plate 40 delimits together with the radial wall 36 of the fan wheel 5 a channel chamber 10' through which the air can flow in a centripetal direction. A portion of the cooling air taken in by the vane arrangement 31 of the fan wheel 5 is, as disclosed above, subjected to centrifugal forces within the fan housing and is supplied as combustion air 44 by the vane arrangement 30 into the closed chamber 10'. Between the bottom 7 of the fan housing 6 and the cover plate 40 the chamber 10 is defined from which the combustion engine, as disclosed above, removes the combustion air through the outlet 11 in the housing bottom 7 in the axial direction. In the cover plate 40 penetrations 38 are arranged in the circumferential direction which allow introduction of the combustion air 44 into the chamber 10 which is separated by the cover plate 40 from the portion 10'. Between the penetrations 38 axial vanes may be provided on the cover plate 40 which with their pushing action provide for a regain of pressure losses resulting from flow losses in the radial flow direction of the channel chamber 10' and especially of the vane arrangement 30. The chamber provided between the cover plate 40 of the fan wheel 5 and the housing bottom 7 is closed radially outwardly of the outlet 11 by a non-dragging seal so that airflow into the chamber 10 in this direction is prevented and the combustion air 44 is forced through the closed channel chamber 10'. In the shown embodiment, the chamber 10 is sealed by an axial labyrinth seal 39.

In the shown embodiment the cover plate 40 is of a double wall construction so that the closed channel chamber in a first section 10' is guided in the centripetal direction from the inlet at the vane arrangement 30 to the inwardly positioned penetrations 38 and is then directed, behind the penetrations 38, into the second section 10" in the centrifugal direction. The outlet 11 in the fan housing bottom 7 is positioned as far radially outwardly as possible so that the combustion air 44, before entering the chamber 10 and flowing into the combustion air channel 9, is accelerated within the second section 10".

Figure 7:
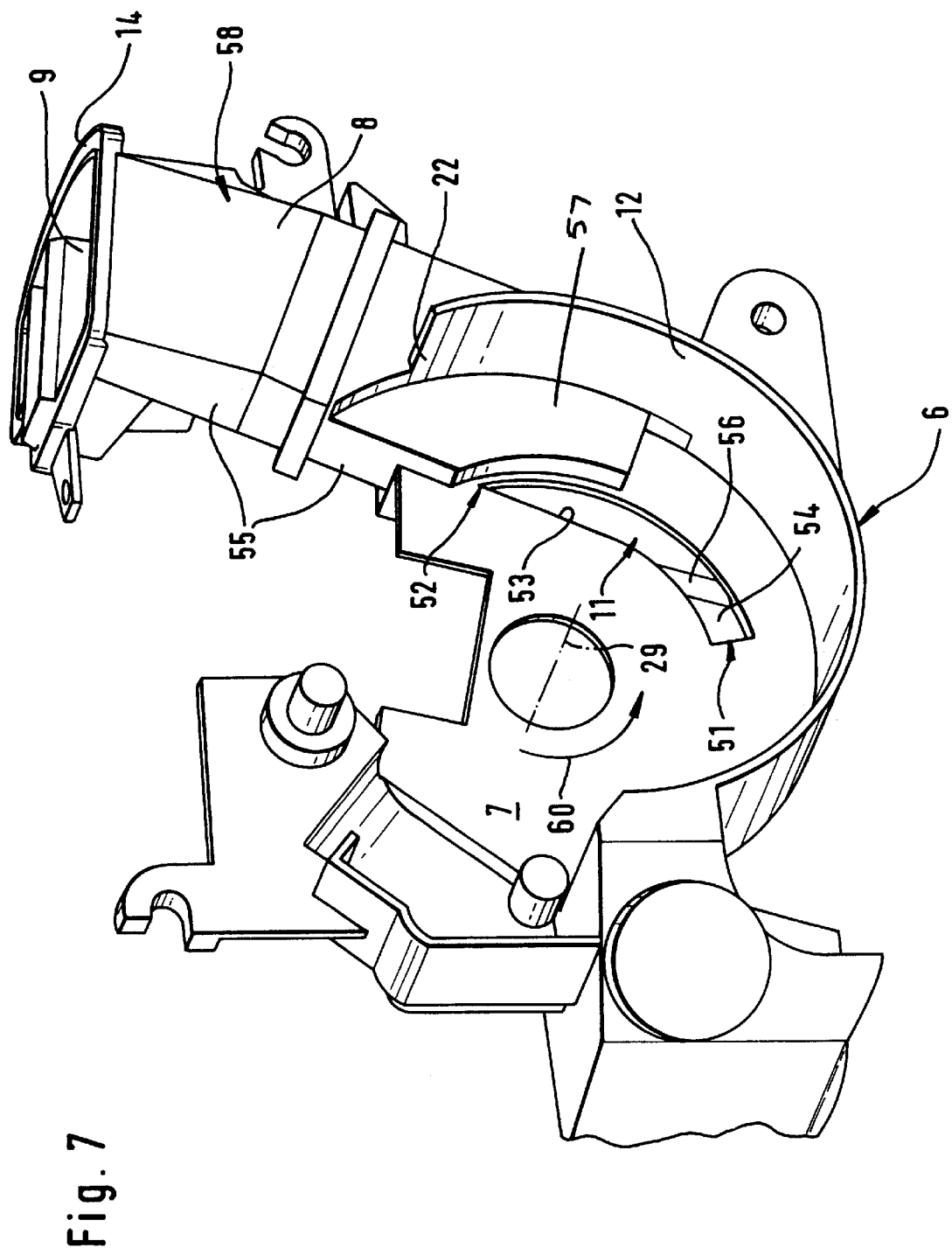
FIG. 7 is a perspective view of a fan housing with straight combustion air channel.

FIG. 7 shows a perspective view of a fan housing 6 in which the combustion air channel 9 is embodied tangentially to the rotational direction of the fan wheel and branches off linearly, and thus on the shortest possible path, to the air filter.

The outlet opening 11 is arc-shaped in the rotational direction 60 of the fan wheel 5. The outlet opening 11 extends as far as possible in the rotational direction 60 so that by the large cross-sectional opening at the same time the flow cross-section of the combustion air channel 9 is continuously increased. The combustion air flows through the outlet opening 11 into the inlet area of the combustion air channel 9 formed by the double-walled bottom 54 and flows, because of the continuously widening of the channel cross-section, without hindrance on the shortest path into the air filter box. The flow cross-section of the combustion air channel 9 ideally widens uniformly in the flow direction whereby, however, due to design-related conditions of the drive unit and the space availability, modifications may be possible. Advantageously, the outlet flow cross-section upstream of the air filter is approximately five times the size of the inlet flow cross-section provided at the outlet opening 11. The flat combustion air channel 9 is widened at the backside of the fan housing 6 parallel to the housing bottom 7 in the flow direction so that the flow cross-section widens. External to the area covered by the housing bottom 7, the channel wall 8 is connected to the circumferential wall 12 of the fan housing 6, covering the fan wheel 5 at a location on the other side of the plane of the fan housing bottom 7, so that the flow cross-section of the channel 9 is additionally widened.

The combustion air channel 9 has a rectangular cross section whereby the end faces of the channel wall 8, positioned in front of one another in the direction of the crankshaft axis 29, are positioned in a common plane with the housing bottom 7 of the fan housing 6. The forward end 51 of the outlet opening 11, in the rotational direction 60 of the crankshaft about its axis 29, is positioned on a side of the crankshaft opposite the combustion engine 2. The outlet opening 11 extends arc-shaped about the crankshaft axis 29 and is spaced from the circumferential wall 12 of the fan housing 6 so that dust-free combustion air close to the bottom 7 is guided from the center of the fan housing 6 into the combustion air channel. An effect of the cooling air flow, guided along the circumferential wall 12 to the cooling air exit 22, on the combustion air flow is precluded.

The outlet opening 11 extends in the rotational direction 60 as far as possible. Its rearward end 52 in the rotational direction 60 is pointed in order to provide for a flow cross-section of the outlet opening 11 as large as possible. The edge 53 forming the pointed end 52 of the outlet opening 11 is adjacent to a plane of the lateral surface 55 of the combustion air channel 9 and extends almost straight. At the end of the air guide spiral, embodied by the fan housing 6, extending to the cooling air outlet 22 of the circumferential wall 12, a projection 57 of the combustion air channel 9 is provided which projects axially from the housing bottom 7 and has an end face that is positioned approximately in a common plane with the housing bottom 7 and the side 58 of the channel wall 8. The channel wall 8 is connected to this side 58 opposite the plane of the housing bottom 7 at the exterior side of the circumferential wall 12. The projection 57 extending arc-shaped between the outlet opening 11 and the circumferential wall 12 provides an additional volume within the combustion air channel 9 and reduces its flow resistance.

The channel wall 8 delimits at the backside of the housing bottom 7 as a double-walled bottom 54 the combustion air channel 9 downstream of the outlet opening 11. The double-walled bottom 54 is of a flat design at the inlet area of the channel 9 in the vicinity of the forward end 51 of the outlet opening 11 in order to allow an arrangement of the fan housing 6 close to the combustion engine 2. The spacing between the double-walled bottom 54 and the housing bottom 7 is increased in the flow direction by the step 56 which is arranged within the angular spacing of the arc of the outlet opening 11. This arc can be preset according to the required mounting space of the crankcase that in the mounted position of the fan housing 6 is adjacent to the housing bottom 7. The portion of the combustion air channel downstream of the housing bottom 7 extends thus adjacent to the crankcase and projects into a space within the drive unit between other components which space is conventionally free.

Figure 8:
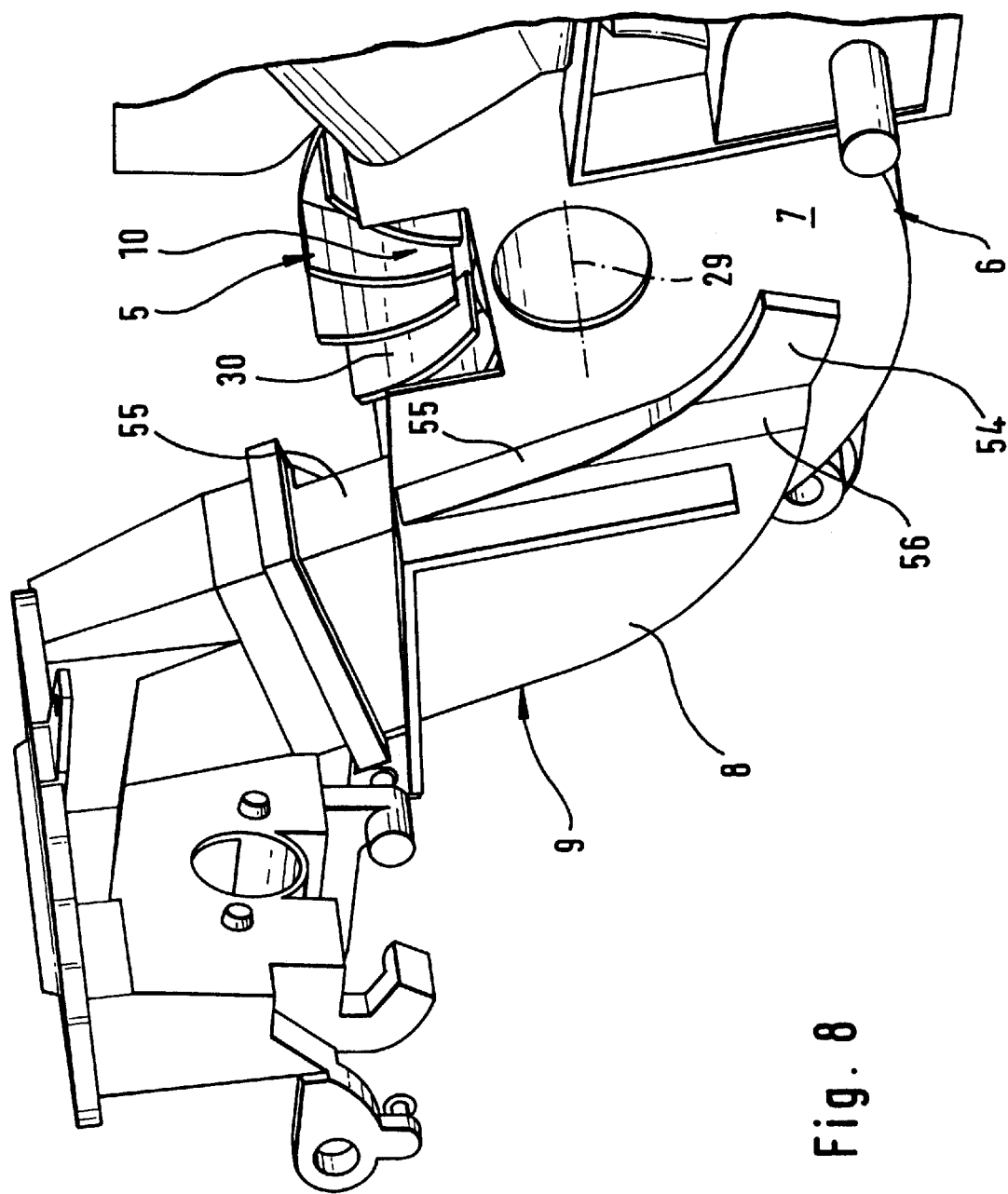
FIG. 8 is a perspective view of the backside of the fan housing according to FIG. 7.

FIG. 8 shows the fan housing 6 with connected combustion air channel 9 from the rear. In order to simplify the representation, the same parts are identified with the same reference numerals used in the previous Figures. This representation illustrates that the forward portion of the combustion air channel 9 (viewed in the flow direction), which is embodied at the backside of the fan housing 6 as a double wall 54 of the housing bottom 7, has a first section that matches the width of the outlet opening 11 at the housing bottom 7 and then continuously widens in the flow direction. The widening causes the combustion air channel to extend tangentially past the housing bottom 7 and extends with an inwardly positioned planar surface 55 straight to the air filter box. Preferably, the outlet cross-section of the combustion air channel 9 adjacent to the air filter device 18, 19, 20 is four to six times as large as the inlet cross-section of the combustion air channel 9 at the outlet opening 11.

The step 56 in the channel wall 8 increases the flow cross-section of the combustion engine greatly and is positioned as closely as possible to the crankcase when the fan housing 6 is slipped onto the crankshaft 4 of the internal combustion engine 2. The step 56 extends in the channel wall 8 substantially parallel to the cylinder axis of the combustion engine 2. The large surface area inlet opening (FIG. 7) in the housing bottom 7 allows entry of much larger mass flows into the combustion air channel 9 from the chamber 10 of the fan wheel 5 which chamber 10 is delimited by the housing bottom 7. The vane arrangement 30 of the fan wheel 5, which is active in the chamber 10, centrifugally acts on the fresh air taken in by the fan wheel 5 so that only air free of dirt particles reaches the area of the outlet opening 11 in the hosing bottom 7.

The specification incorporates by reference the disclosure of German priority documents 197 52 798.1 of Nov. 28, 1997, and 198 33 126.6 of Jul. 23, 1998.

The present invention is, of course, in no way restricted to the specific disclosure of the specification and drawings, but also encompasses any modifications within the scope of the appended claims.

What is claimed is:

1. A hand-held working tool comprising:

an engine housing (17);

an inter combustion engine (2) arranged in said engine housing (17) and comprising a crankshaft (4) and air filter device (18, 19, 20);

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4), wherein said bottom (7) is positioned directly adjacent to said internal combustion engine (2) and said crankshaft (4), such that said fan housing (6) has a minimal axial depth;

said bottom (7) and a side of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20);

said combustion air outlet (11) axially supplying combustion air from said chamber (10) through said combustion air channel (9, 9u, 9s) into said air filter device (18, 19, 20) of said internal combustion engine (2);

said fan housing (6) having a channel wall (8, 8u, 8s) having a bottom portion (8s) connected to a face of said bottom (7) remote from said fan wheel (5) and covering said bottom (7) partially to form a double-walled bottom, wherein said combustion air channel is provided at an end face portion (9s) of said fan housing (6), said combustion air channel (9, 9u, 9s) defined by said bottom (7) and said portion (8s).

2. A working tool according to claim 1, wherein said fan housing (6) has a circumferential wall (12) covering said fan wheel (5) in an axial direction of said fan housing (6), wherein said channel wall (8, 8u, 8s) has a tangential portion (8u) projecting tangentially past a periphery of said bottom (7) and projecting axially past said bottom (7) in a direction toward said circumferential wall (12), wherein said tangential portion (8u) of said channel wall (8, 8u, 8s) is connected to said circumferential wall (12) at a spacing such that said tangential portion (8u) and said circumferential wall (12) form a circumferential portion (9u) of said combustion air channel (9, 9u, 9s).

3. A working tool according to claim 2, wherein said end face portion (9s) of said combustion air channel (9) has a flow cross-section decreasing continuously in a flow direction of said combustion air and wherein said circumferential portion (9u) has a widened flow cross-section relative to said end face portion (9s).

4. A working tool according to claim 2, wherein said circumferential portion (9u) of said combustion air channel (9) forms the end of said combustion air channel connected to said air filter device (18, 19, 20).

5. A working tool according to claim 2, further comprising an elastic bellows (16), wherein said combustion air channel (9, 9u, 9s) has an end socket (14) connected to said fan housing (6) and wherein said air filter device (18, 19, 20) is connected to said end socket (14) by said elastic bellows (16) positioned adjacent to said internal combustion engine (2), wherein said elastic bellows (16) is attached to a circumferential edge (15) of said end socket (14) and bridges a vibration gap.

6. A working tool according to claim 5, wherein said air filter device (18, 19, 20) comprises an air filter box (19) having a dirt chamber (21) and wherein said elastic bellows (16) is connected to said dirt chamber (21) of said air filter box (19).

7. A working tool according to claim 5, wherein said circumferential wall (12) has a cutout forming a cooling air outlet (22), wherein said end socket (14) is positioned adjacent to said cutout (22).

8. A hand-held working tool comprising:
   an engine housing (17);
   an internal combustion engine (2) arranged in said engine housing (17) and comprising a crankshaft (4) and an air filter device (18, 19, 20);
   a tool (41) driven by said crankshaft (4) of said internal combustion engine (2);
   a fan housing (6) attached to said engine housing (2) and having an air inlet;
   a fan wheel (5) arranged in said fan housing (6);
   said fan wheel (5) driven by said crankshaft (4) of said internal combustion engine (2) to supply cooling air, sucked in through said air inlet, to said internal combustion engine (2);
   said fan housing (6) having a bottom (7) extending radially to said crankshaft (4);
   said bottom (7) and a side of said fan wheel (5) facing said bottom (7) defining a chamber (10) in said fan housing (6);
   said bottom (7) having a combustion air outlet (11);
   a combustion air channel (9, 9u, 9s) connecting said combustion air outlet (11) to said air filter device (18, 19, 20);
   said combustion air outlet (11) axially supplying combustion air from said chamber (10) through said combustion air channel (9, 9u, 9s) into said air filter device (18, 19, 20) of said internal combustion engine (2);
   said fan housing (6) having a channel wall (8, 8u, 8s) having a bottom portion (8s) connected to a face of said bottom (7) remote from said fan wheel (5) and covering said bottom (7) partially to form a double-walled bottom, wherein an end face portion (9s) of said combustion air channel (9, 9u, 9s) is defined by said bottom (7) and said bottom portion (8s);
   said fan housing (6) further having a circumferential wall (12) covering said fan wheel (5) in an axial direction of said fan housing (6), wherein said channel wall (8, 8u, 8s) has a tangential portion (8u) projecting tangentially past a periphery of said bottom (7) and projecting axially past said bottom (7) in a direction toward said circumferential wall (12), wherein said tangential portion (8u) of said channel wall (8, 8u, 8s) is connected to said circumferential wall (12) at a spacing such that said tangential portion (8u) and said circumferential wall (12) form a circumferential portion (9u) of said combustion air channel (9, 9u, 9s).

9. A working tool according to claim 8, wherein said combustion air outlet (11) is located in said bottom (7), relative to said crankshaft (4), opposite said internal combustion engine (2).

10. A working tool according to claim 8, wherein a spacing of a radially outer edge of said combustion air outlet (11) to an axis of said crankshaft (4) is 0.5 to 1.4 times a radius of said fan wheel (5).

11. A working tool according to claim 8, wherein said combustion air outlet (11) has a main extension in a circumferential direction of said bottom (7).

12. A working tool according to claim 8, wherein said fan housing (6) is comprised of a base member, including said bottom (7) and said circumferential wall (12), and an end face member (46) comprising said bottom portion (8s) of said channel wall.

13. A working tool according to claim 8, wherein said fan housing (6) is a guide spiral opening toward said combustion engine (2).

14. A working tool according to claim 1, wherein said fan wheel (5) has a radial wall (36) having a first face with a first vane arrangement (30) and a second face with a second vane arrangement (31), wherein said first vane arrangement (30) sucks in the cooling air for said internal combustion engine (2) and wherein said second vane arrangement faces said bottom (7) and has radial vanes (34) projecting into said chamber (10).

15. A working tool according to claim 14, wherein said first vane arrangement (31) has curved vanes having an axial length that is greater than an axial length of said radial vanes (34).

16. A working tool according to claim 14, wherein an axial height of said radial vanes (34) is at least one fourth of a spacing between said bottom (7) and said radial wall (36).

17. A working tool according to claim 14, wherein a central portion of said radial wall (36) is curved away from said bottom (7).

18. A working tool according to claim 14, wherein said first face of said radial wall (36) has an auxiliary axial blower vane arrangement (37) passing across said combustion air outlet (11).

19. A working tool according to claim 14, wherein said first face of said radial wall (36) is radially covered by a cover plate (40) fastened to said fan wheel (5), wherein said cover plate (40) has penetrations (38) and wherein between said cover plate (40) and said bottom (7) radially outwardly of said combustion air outlet (11) a non-dragging seal 39 of said chamber (10) is arranged.

20. A working tool according to claim 14, wherein said fan wheel (5) has at least one ignition solenoid (49) positioned at the periphery of said fan wheel 95), wherein said at least one ignition solenoid (49) is positioned within said second vane arrangement (30) and extends axially at least to said radial wall (36).

21. A working tool according to claim 14, wherein said radial vanes (34) of said second vane arrangement (30) have a cross-section increasing in a radial outward direction of said fan wheel (5) and are symmetrical to a radial axis (35) of said fan wheel.

22. A hand-held working tool comprising:
   an engine housing (17);
   a drive unit 50 including an internal combustion engine (2) arranged in said engine housing (17) and comprising a crankshaft (4) and an air filter device (18, 19, 20);
   a support (13) to which said drive unit (50) is connected;
   a tool (41) driven by said crankshaft (4) of said internal combustion engine (2);
   a fan housing (6) attached to said engine housing (2) and having an air inlet;
   a fan wheel (5) arranged in said fan housing (6);
   said fan wheel (5) driven by said crankshaft (4) of said internal combustion engine (2) to supply cooling air, sucked in through said air inlet, to said internal combustion engine (2);
   said fan housing (6) having a bottom (7) extending radially to said crankshaft (4);
   said bottom (7) and a face (33) of said fan wheel (5) facing said bottom (7) defining a chamber (10) in said fan housing (6);
   said bottom (7) having a combustion air outlet (11);
   a combustion air channel (9, 9u, 9s) connecting said combustion air outlet (11) to said air filter device (18, 19, 20) said combustion air outlet (11) axially supplying combustion air from said chamber (10) through said combustion air channel (9) into said air filter device (18, 19, 20) of said internal combustion engine (2);
   wherein said support (13) includes a hollow beam (13) and wherein said combustion air channel (9) extends inside said hollow beam (13).

23. A working tool according to claim 22, wherein said fan wheel (5) has a radial wall (36) having a first face with a first vane arrangement (30) and a second face with a second vane arrangement (31), wherein said first vane arrangement (30) sucks in the cooling air for said internal combustion engine (2) and wherein said second vane arrangement faces said bottom (7) and has radial vanes (34) projecting into said chamber (10).

24. A working tool according to claim 23, wherein said first vane arrangement (31) has curved vanes having an axial length that is greater than an axial length of said radial vanes (34).

25. A working tool according to claim 23, wherein an axial height of said radial vanes (34) is at least one fourth of a spacing between said bottom (7) and said radial wall (36).

26. A working tool according to claim 23, wherein a central portion of said radial wall (36) is curved away from said bottom (7).

27. A working tool according to claim 22, wherein said first face of said radial wall (36) has an auxiliary axial blower vane arrangement (37) passing across said combustion air outlet (11).

28. A working tool according to claim 22, wherein said first face of said radial wall (36) is radially covered by a cover plate (40) fastened to said fan wheel (5), wherein said cover plate (40) has penetrations (38) and wherein between said cover plate (40) and said bottom (7) radially outwardly of said combustion air outlet (11) a non-dragging seal 39 of said chamber (10) is arranged.

29. A working tool according to claim 22, wherein said fan wheel (5) has at least one ignition solenoid (49) positioned at the periphery of said fan wheel 95), wherein said at least one ignition solenoid (49) is positioned within said second vane arrangement (30) and extends axially at least to said radial wall (36).

30. A working tool according to claim 23, wherein said radial vanes (34) of said second vane arrangement (30) have a cross-section increasing in a radial direction toward an axis of said crankshaft (4) and are symmetrical to a radial axis (35) of said fan wheel (5).

31. A working tool according to claim 1, wherein said combustion air channel (9) branches substantially tangentially to a rotational direction (60) of said fan wheel (5) away from said fan housing (6) and extends linearly to said air filter device (18, 19, 20).

32. A working tool according to claim 31, wherein said combustion air channel (9) has a flow cross-section widening continuously in a flow direction of the combustion air, wherein an outlet cross-section of said combustion air channel (9) adjacent to said air filter device (18, 19, 20) is four to six times as large as an inlet cross-section of said combustion air channel (9).

33. A working tool according to claim 31, wherein said outlet opening (11) extends arc-shaped in said rotational direction (60) and has a rearward end (52) and a forward end (51) in said rotational direction (60), wherein said rearward end (52) is adjacent to a plane (28) of a lateral surface (55) of said combustion air channel (9) facing said crankshaft (4) and wherein said forward end (51) is positioned at a side of said crankshaft (4) opposite said combustion engine (2).

34. A working tool according to claim 33, wherein said combustion air channel (9) widens in said flow direction parallel to said housing bottom (7) and at said forward end (51) is flat in an axial direction of said crankshaft (4), wherein said double-walled bottom (54) has a spacing to said housing bottom (7) that increases within an angular distance of said arc-shaped outlet opening (11), wherein said spacing is preset according to a mounting space of a crankcase of said internal combustion engine (2) positioned adjacent to said housing bottom (7).

35. A working tool according to claim 31, wherein said combustion air channel (9) has an axial projection (57) projecting from said housing bottom (7) into said fan housing (6), said axial projection (57) having an end face extending parallel to a plane of said housing bottom (7).

36. A working tool according to claim 31, wherein said fan housing (6) has a circumferential wall (12) covering axially said fan wheel (5), wherein said channel wall (8) is connected at a location opposite a plane of said housing bottom (7) to said circumferential wall (12) of said fan housing (6).

37. A working tool according to claim 31, wherein a volume of an air filter box (19) of said air filter device is at least five times a displacement of said internal combustion engine (2).

38. A hand-held working tool comprising:
   an engine housing (17);
   an internal combustion engine (2) arranged in said engine housing (17) and comprising a crankshaft (4) and an air filter device (18, 19, 20);
   a tool (41) driven by said crankshaft (4) of said internal combustion engine (2);
   a fan housing (6) attached to said engine housing (2) and having an air inlet;
   a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a side of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20);

said combustion air outlet (11) axially supplying combustion air from said chamber (10) through said combustion air channel (9, 9u, 9s) into said air filter device (18, 19, 20) of said internal combustion engine (2);

said fan housing (6) having a channel wall (8, 8u, 8s) having a bottom portion (8s) connected to a face of said bottom (7) remote from said fan wheel (5) and covering said bottom (7) partially to form a double-walled bottom, wherein an end face portion (9s) of said combustion air channel (9, 9u, 9s) is defined by said bottom (7) and said bottom portion (8s);

said fan wheel (5) having a radial wall (36) having a first face with a first vane arrangement (3) and a second face with a second vane arrangement (31), wherein said first vane arrangement (3) sucks in the cooling air for said internal combustion engine (2) and wherein said second vane arrangement faces said bottom (7) and has radial vanes (34) projecting into said chamber (10), wherein said first face of said radial wall (36) is radially covered by a cover plate (4) fastened to said fan wheel (5), wherein said cover plate (4) has penetrations (38) and wherein between said cover plate (4) and said bottom (7) radially outwardly of said combustion air outlet (11) a non-dragging seal 39 of said chamber (10) is arranged.

39. A hand-held working tool comprising:

an engine housing (17);

an internal combustion engine (2) arranged in said engine housing (17) and comprising a crankshaft (4) and an air filter device (18, 19, 20);

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a side of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20);

said combustion air outlet (11) axially supplying combustion air from said chamber (10) through said combustion air channel (9, 9u, 9s) into said air filter device (18, 19, 20) of said internal combustion engine (2);

said fan housing (6) having a channel wall (8, 8u, 8s) having a bottom portion (8s) connected to a face of said bottom (7) remote from said fan wheel (5) and covering said bottom (7) partially to form a double-walled bottom, wherein an end face portion (9s) of said combustion air channel (9, 9u, 9s) is defined by said bottom (7) and said bottom portion (8s);

said fan wheel (5) having a radial wall (36) having a first face with a first vane arrangement (3) and a second face with a second vane arrangement (31), wherein said first vane arrangement (3) sucks in the cooling air for said internal combustion engine (2) and wherein said second vane arrangement faces said bottom (7) and has radial vanes (34) projecting into said chamber (10), said fan wheel (5) having at least one ignition solenoid (49) positioned at the periphery of said fan wheel (5), wherein said at least one ignition solenoid (49) is positioned within said second vane arrangement (30) and extends axially at least to said radial wall (36).

40. A hand-held working tool comprising:

an engine housing (17);

an internal combustion engine (2) arranged in said engine housing (17) and comprising a crankshaft (4) and an air filter device (18, 19, 20);

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a side of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20), wherein said combustion air channel (9) branches substantially tangentially to a rotational direction (60) of said fan wheel (5) away from said fan housing (6) and extends linearly to said air filter device (18, 19, 20), and wherein said combustion air channel (9) has a flow cross-section widening continuously in a flow direction of the combustion air, wherein an outlet cross-section of said combustion air channel (9) adjacent to said air filter device (18, 19, 20) is four to six times as large as an inlet cross-section of said combustion air channel (9);

said combustion air outlet (11) axially supplying combustion air from said chamber (10) through said combustion air channel (9, 9u, 9s) into said air filter device (18, 19, 20) of said internal combustion engine (2);

said fan housing (6) having a channel wall (8, 8u, 8s) having a bottom portion (8s) connected to a face of said bottom (7) remote from said fan wheel (5) and covering said bottom (7) partially to form a double-walled bottom, wherein an end face portion (9s) of said combustion air channel (9, 9u, 9s) is defined by said bottom (7) and said bottom portion (8s).

41. A hand-held working tool comprising:

an engine housing (17);

an internal combustion engine (2) arranged in said engine housing (17) and comprising a crankshaft (4) and an air filter device (18, 19, 20);

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a side of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20)), wherein said combustion air channel (9) branches substantially tangentially to a rotational direction (60) of said fan wheel (5) away from said fan housing (6) and extends linearly to said air filter device (18, 19, 20), wherein said combustion air outlet (11) extends arc-shaped in said rotational direction (60) and has a rearward end (52) and a forward end (51) in said rotational direction (60), wherein said rearward end (52) is adjacent to a plane (28) of a lateral surface (55) of said combustion air channel (9) facing said crankshaft (4) and wherein said forward end (51) is positioned at a side of said crankshaft (4) opposite said combustion engine (2);

said combustion air outlet (11) axially supplying combustion air from said chamber (10) through said combustion air channel (9, 9u, 9s) into said air filter device (18, 19, 20) of said internal combustion engine (2);

said fan housing (6) having a channel wall (8, 8u, 8s) having a bottom portion (8s) connected to a face of said bottom (7) remote from said fan wheel (5) and covering said bottom (7) partially to form a double-walled bottom, wherein an end face portion (9s) of said combustion air channel (9, 9u, 9s) is defined by said bottom (7) and said bottom portion (8s).

42. A hand-held working tool comprising:

an engine housing (17);

an internal combustion engine (2) arranged in said engine housing (17) and comprising a crankshaft (4) and an air filter device (18, 19, 20);

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a side of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20), wherein said combustion air channel (9) branches substantially tangentially to a rotational direction (60) of said fan wheel (5) away from said fan housing (6) and extends linearly to said air filter device (18, 19, 20);

said combustion air outlet (11) axially supplying combustion air from said chamber (10) through said combustion air channel (9, 9u, 9s) into said air filter device (18, 19, 20) of said internal combustion engine (2); said fan housing (6) having a channel wall (8, 8u, 8s) having a bottom portion (8s) connected to a face of said bottom (7) remote from said fan wheel (5) and covering said bottom (7) partially to form a double-walled bottom, wherein an end face portion (9s) of said combustion air channel (9, 9u, 9s) is defined by said bottom (7) and said bottom portion (8s), said fan housing (6) having a circumferential wall (12) covering axially said fan wheel (5), wherein said channel wall (8) is connected at a location opposite a plane of said housing bottom (7) to said circumferential wall (12) of said fan housing (6).

43. A hand-held working tool comprising:

an engine housing (17);

a drive unit (50) including an internal combustion engine (2) arranged in said engine housing (17) and comprising a crankshaft (4) and an air filter device (18, 19, 20)

a support (13) to which said drive unit (50) is connected;

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a face (33) of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20);

said combustion air outlet (11) axially supplying combustion air from said chamber (10) through said combustion air channel (9) into said air filter device (18, 19, 20) of said internal combustion engine (2);

wherein said support (13) includes a hollow beam (13) and wherein said combustion air channel (9) extends inside said hollow beam (13);

said fan wheel (5) having a radial wall (36) having a first face with a first vane arrangement (3) and a second face with a second vane arrangement (31), wherein said first vane arrangement (3) sucks in the cooling air for said internal combustion engine (2) and wherein said second vane arrangement faces said bottom (7) and has radial vanes (34) projecting into said chamber (10), said first face of said radial wall (36) radially covered by a cover plate (40) fastened to said fan wheel (5), wherein said cover plate (4) has penetrations (38) and wherein between said cover plate (4) and said bottom (7)

radially outwardly of said combustion air outlet (11) a non-dragging seal (39) of said chamber (10) is arranged.

44. A hand-held working tool comprising:

an engine housing (17);

a drive unit (50) including an internal combustion engine (2) arranged in said engine housing (17) and comprising a crankshaft (4) and an air filter device (18, 19, 20)

a support (13) to which said drive unit (50) is connected;

a tool (41) driven by said crankshaft (4) of said internal combustion engine (2);

a fan housing (6) attached to said engine housing (2) and having an air inlet;

a fan wheel (5) arranged in said fan housing (6);

said fan wheel (5) driven by said crankshaft (4) of said internal combustion engine (2) to supply cooling air, sucked in through said air inlet, to said internal combustion engine (2);

said fan housing (6) having a bottom (7) extending radially to said crankshaft (4);

said bottom (7) and a face (33) of said fan wheel (5) facing said bottom (7) defining a chamber (10) in said fan housing (6);

said bottom (7) having a combustion air outlet (11);

a combustion air channel (9, 9u, 9s) connecting said combustion air outlet (11) to said air filter device (18, 19, 20);

said combustion air outlet (11) axially supplying combustion air from said chamber (10) through said combustion air channel (9) into said air filter device (18, 19, 20) of said internal combustion engine (2);

wherein said support (13) includes a hollow beam (13) and wherein said combustion air channel (9) extends inside said hollow beam (13);

said fan wheel (5) having a radial wall (36) having a first face with a first vane arrangement (3) and a second face with a second vane arrangement (31), wherein said first vane arrangement (3) sucks in the cooling air for said internal combustion engine (2) and wherein said second vane arrangement faces said bottom (7) and has radial vanes (34) projecting into said chamber (10), said fan wheel (5) having at least one ignition solenoid (49) positioned at the periphery of said fan wheel (5), wherein said at least one ignition solenoid (49) is positioned within said second vane arrangement (30) and extends axially at least to said radial wall (36).

* * * * *